US011117566B2

(12) United States Patent
Pursifull et al.

(10) Patent No.: US 11,117,566 B2
(45) Date of Patent: Sep. 14, 2021

(54) METHODS AND SYSTEMS OF A HYBRID VEHICLE

(71) Applicant: Ford Global Technologies, LLC, Dearborn, MI (US)

(72) Inventors: Ross Dykstra Pursifull, Dearborn, MI (US); Thomas Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 535 days.

(21) Appl. No.: 15/974,571

(22) Filed: May 8, 2018

(65) Prior Publication Data

US 2019/0344774 A1     Nov. 14, 2019

(51) Int. Cl.
| | | |
|---|---|---|
| *B60W 20/12* | (2016.01) | |
| *B60W 20/13* | (2016.01) | |
| *B60W 20/40* | (2016.01) | |
| *B60W 10/26* | (2006.01) | |

(52) U.S. Cl.
CPC ............ *B60W 20/12* (2016.01); *B60W 10/26* (2013.01); *B60W 20/13* (2016.01); *B60W 20/40* (2013.01); *B60W 2510/0676* (2013.01); *B60W 2510/087* (2013.01); *B60W 2510/246* (2013.01); *B60W 2530/145* (2013.01); *B60W 2530/18* (2013.01); *B60W 2540/30* (2013.01); *B60W 2710/08* (2013.01); *B60W 2710/248* (2013.01)

(58) Field of Classification Search
CPC ...... B60W 20/12; B60W 20/13; B60W 10/26; B60W 10/08; B60W 10/06; B60W 20/40; B60W 20/11; B60W 10/115; B60L 58/13; B60L 53/63; B60L 58/12
See application file for complete search history.

(56) References Cited

U.S. PATENT DOCUMENTS

| 8,560,155 | B2 * | 10/2013 | Kedar-Dongarkar | ....................... B60W 10/26 701/22 |
|---|---|---|---|---|
| 8,731,752 | B2 * | 5/2014 | Yu | ............................ B60L 58/12 701/22 |
| 8,774,993 | B2 * | 7/2014 | Harada | .................. B60K 6/445 701/22 |
| 9,056,556 | B1 * | 6/2015 | Hyde | ....................... B60L 58/20 |
| 9,132,833 | B2 * | 9/2015 | Hokoi | .................... B60W 20/12 |
| 9,172,116 | B2 * | 10/2015 | Ross | ...................... H01M 10/44 |
| 9,499,161 | B2 * | 11/2016 | Ogawa | .................. B60W 20/12 |
| 9,751,519 | B2 * | 9/2017 | Nawata | ...................... H02J 7/34 |

(Continued)

OTHER PUBLICATIONS

Pursifull, R. et al., "Hybrid Electric Fuel Conservation System," U.S. Appl. No. 15/870,511, filed Jan. 12, 2018, 35 pages.

*Primary Examiner* — Luis A Martinez Borrero
(74) *Attorney, Agent, or Firm* — Geoffrey Brumbaugh; McCoy Russell LLP

(57) ABSTRACT

Methods and systems are provided for a hybrid electric vehicle. In one example, a method may include delaying an electric-only operation of the hybrid vehicle in response to a powertrain temperature being less than a threshold powertrain temperature and an electric-only range being less than a distance between a current location and a recharging location. The electric-only operation may be initiated in response to one or more of the powertrain temperature exceeding the threshold powertrain temperature and the electric-only range being equal to the distance.

20 Claims, 7 Drawing Sheets

(56) References Cited

U.S. PATENT DOCUMENTS

| | | | | |
|---|---|---|---|---|
| 9,902,392 B2* | 2/2018 | Ogawa | | B60W 20/40 |
| 10,065,628 B2* | 9/2018 | McGee | | B60W 20/00 |
| 10,112,597 B2* | 10/2018 | Belt | | B60W 10/08 |
| 10,173,694 B2* | 1/2019 | Nishimine | | B60W 50/082 |
| 10,435,007 B2* | 10/2019 | Follen | | B60W 20/12 |
| 10,471,950 B2* | 11/2019 | Kim | | B60W 10/06 |
| 10,562,520 B2* | 2/2020 | Nishimine | | B60W 30/182 |
| 10,576,966 B2* | 3/2020 | Endo | | B60W 20/17 |
| 2005/0209046 A1* | 9/2005 | Potter | | F16H 61/0213 |
| | | | | 477/115 |
| 2005/0228553 A1* | 10/2005 | Tryon | | B60L 58/40 |
| | | | | 701/22 |
| 2006/0113129 A1* | 6/2006 | Tabata | | B60K 6/48 |
| | | | | 180/65.25 |
| 2009/0277702 A1* | 11/2009 | Kanada | | B60W 10/26 |
| | | | | 180/65.29 |
| 2010/0094496 A1* | 4/2010 | Hershkovitz | | B60L 3/12 |
| | | | | 701/22 |
| 2010/0236502 A1* | 9/2010 | Watanabe | | F02G 5/02 |
| | | | | 123/41.02 |
| 2012/0290159 A1* | 11/2012 | McGee | | B60W 20/00 |
| | | | | 701/22 |
| 2014/0114514 A1 | 4/2014 | Crombez et al. | | |
| 2014/0277885 A1* | 9/2014 | Morimoto | | B60W 30/1882 |
| | | | | 701/22 |
| 2014/0316939 A1* | 10/2014 | Uyeki | | B60L 58/12 |
| | | | | 705/26.9 |
| 2014/0350789 A1* | 11/2014 | Anker | | B60W 50/087 |
| | | | | 701/41 |
| 2015/0075142 A1* | 3/2015 | Hashimoto | | B60W 30/18054 |
| | | | | 60/300 |
| 2015/0102118 A1* | 4/2015 | Hirabayashi | | B60H 1/3213 |
| | | | | 237/12.3 R |
| 2015/0112524 A1* | 4/2015 | Wang | | B60W 10/08 |
| | | | | 701/22 |
| 2015/0294228 A1* | 10/2015 | Saito | | G06Q 50/06 |
| | | | | 706/48 |
| 2015/0314775 A1* | 11/2015 | Dextreit | | B60W 20/12 |
| | | | | 701/22 |
| 2016/0137185 A1* | 5/2016 | Morisaki | | B60K 6/445 |
| | | | | 701/22 |
| 2016/0185339 A1* | 6/2016 | Ogawa | | B60W 30/182 |
| | | | | 701/22 |
| 2016/0207521 A1* | 7/2016 | Ogawa | | B60W 30/182 |
| 2016/0221567 A1* | 8/2016 | Ogawa | | G01C 21/3469 |
| 2016/0221568 A1* | 8/2016 | Ogawa | | B60W 10/08 |
| 2016/0257301 A1* | 9/2016 | Ogawa | | B60W 20/14 |
| 2016/0280219 A1* | 9/2016 | Nawata | | F02D 11/107 |
| 2017/0088114 A1* | 3/2017 | Nawata | | H02J 7/34 |
| 2018/0056973 A1* | 3/2018 | Belt | | B60W 20/13 |
| 2018/0056982 A1* | 3/2018 | Endo | | B60W 10/18 |
| 2018/0065622 A1* | 3/2018 | Nishimine | | B60W 10/06 |
| 2018/0065643 A1* | 3/2018 | Nishimine | | B60K 6/445 |
| 2018/0170360 A1* | 6/2018 | Kim | | B60W 20/40 |
| 2018/0236995 A1* | 8/2018 | Iwamoto | | B60W 20/15 |
| 2018/0339697 A1* | 11/2018 | Ogawa | | B60W 10/08 |
| 2018/0354492 A1* | 12/2018 | Meyer | | B60K 6/485 |
| 2019/0031180 A1* | 1/2019 | Lee | | B60K 6/383 |
| 2019/0040779 A1* | 2/2019 | Phillips | | F01N 3/2086 |
| 2019/0126904 A1* | 5/2019 | Son | | B60K 6/48 |
| 2019/0140578 A1* | 5/2019 | Lee | | B60W 20/15 |
| 2019/0184897 A1* | 6/2019 | Zheng | | B60W 60/0059 |
| 2019/0308603 A1* | 10/2019 | Matsumura | | B60W 10/08 |
| 2019/0344780 A1* | 11/2019 | Ruybal | | B60W 20/19 |
| 2020/0164860 A1* | 5/2020 | Morita | | B60W 10/06 |

* cited by examiner

METHODS AND SYSTEMS OF A HYBRID VEHICLE

FIELD

The present description relates generally to delaying operation of an electric-only operation of a hybrid vehicle.

BACKGROUND/SUMMARY

In electric and hybrid electric vehicles (HEVs), long and short distance travel or trips can be unnecessarily inefficient when the electric only (charge depletion) and combustion engine (charge sustain) drive modes are not optimally managed. In some HEVs, for example plug-in HEVs (PHEVs), the electric only or charge depletion drive mode range or maximum distance may be less than that of the combustion engine or charge sustain drive mode. Additionally, while some HEVs and PHEVs include manually selectable and/or semi-automatic and/or fully automatic drive mode control systems, many vehicles may continue to experience less than optimal drive mode efficiency, such that charge depletion, electric only drive mode ranges/distances are much less, and charge sustain fuel consumption is much greater, than what might be possible with certain adjustments.

This can be especially noticeable when electric energy is inefficiently consumed for powering vehicle accessories, instead of being conserved to extend an electric only range. Also, inefficient operation can be compounded when manual and semi-automatic and fully automatic drive mode systems are not optimized to select the most efficient drive mode for the instantaneous driving and vehicle conditions, such that too much electrical power and combustion fuel are consumed during operation.

Electric only and combustion engine drive mode efficiencies may be affected by the ambient environment, vehicle performance and component conditions, and other factors, which can introduce undesirable inefficiencies during operation of the drive modes. In view of the stochastic nature of ever changing environmental, vehicle, and component conditions, such drive mode control inefficiencies have persisted despite some attempts at adjustments. Some such attempts have been directed to enabling charge sustain and depletion drive modes in response to driver requests, as well as enabling the charge sustain, combustion engine drive mode in response to detecting a depleted battery state of charge (SOC). However, opportunities for improvement to HEV operating efficiencies remain despite these attempts.

In one example, the issues described above may be addressed by a system for a hybrid vehicle comprising an engine and an electric motor and a controller with computer-readable instructions stored on non-transitory memory thereof that when executed enable the controller to switch from engine propulsion to electric motor propulsion in response to a remaining trip distance relative to an electric range. In this way, a battery SOC may be consumed in response to the remaining trip distance being substantially equal to the electric range, thereby depleting the battery SOC to substantially zero upon arriving at a recharging location.

As one example, the electric-only operation may be delayed until the vehicle is within the electric range of the recharging location or until a powertrain temperature is greater than a threshold powertrain temperature to allow waste heat from engine combustion to heat one or more of the vehicle powertrain, battery, and vehicle cabin. By doing this, lubricant viscosity and friction may be decreased for a remainder of the trip, which may increase an electric-only range and further decrease fuel consumption. Thus, the vehicle may be propelled by an engine to begin a trip, switch to electric-only operation during the trip, and begin to drain a battery SOC when an electric-only range of the vehicle is increased such that the battery SOC reaches zero upon arriving at the recharging location.

In some examples, the electric-only operation may be delayed in response to one or more of an ambient temperature being less than a threshold ambient temperature and a trip length to the intended destination is greater than an electric range. Thus, in some examples, if the ambient temperature is greater than the threshold ambient temperature, then the electric-only operation may be activated at the start of the trip, even if the trip length is greater than the electric range. In this way, the hybrid electric vehicle (HEV), which may include plug-in hybrids (PHEVs) and battery electric vehicles (BEVs), may switch from propelling the HEV via the engine to propelling the HEV via only the electric motor when ambient temperatures are less than the threshold ambient temperatures at a start of the trip, where the threshold ambient temperature may correspond to a cold-start of the HEV.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
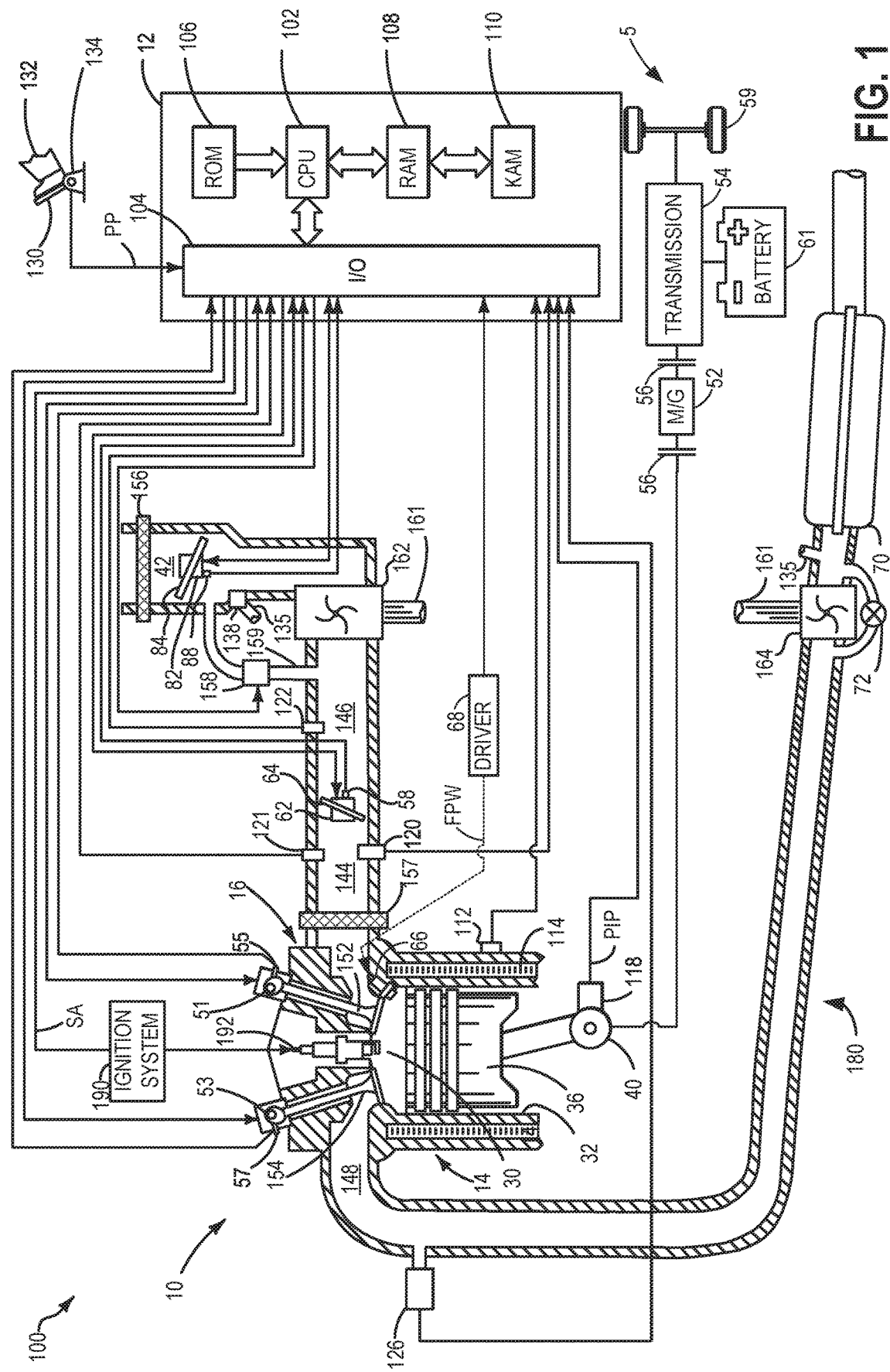
FIG. 1 illustrates a schematic of an engine included in a hybrid vehicle.
Figure 2:
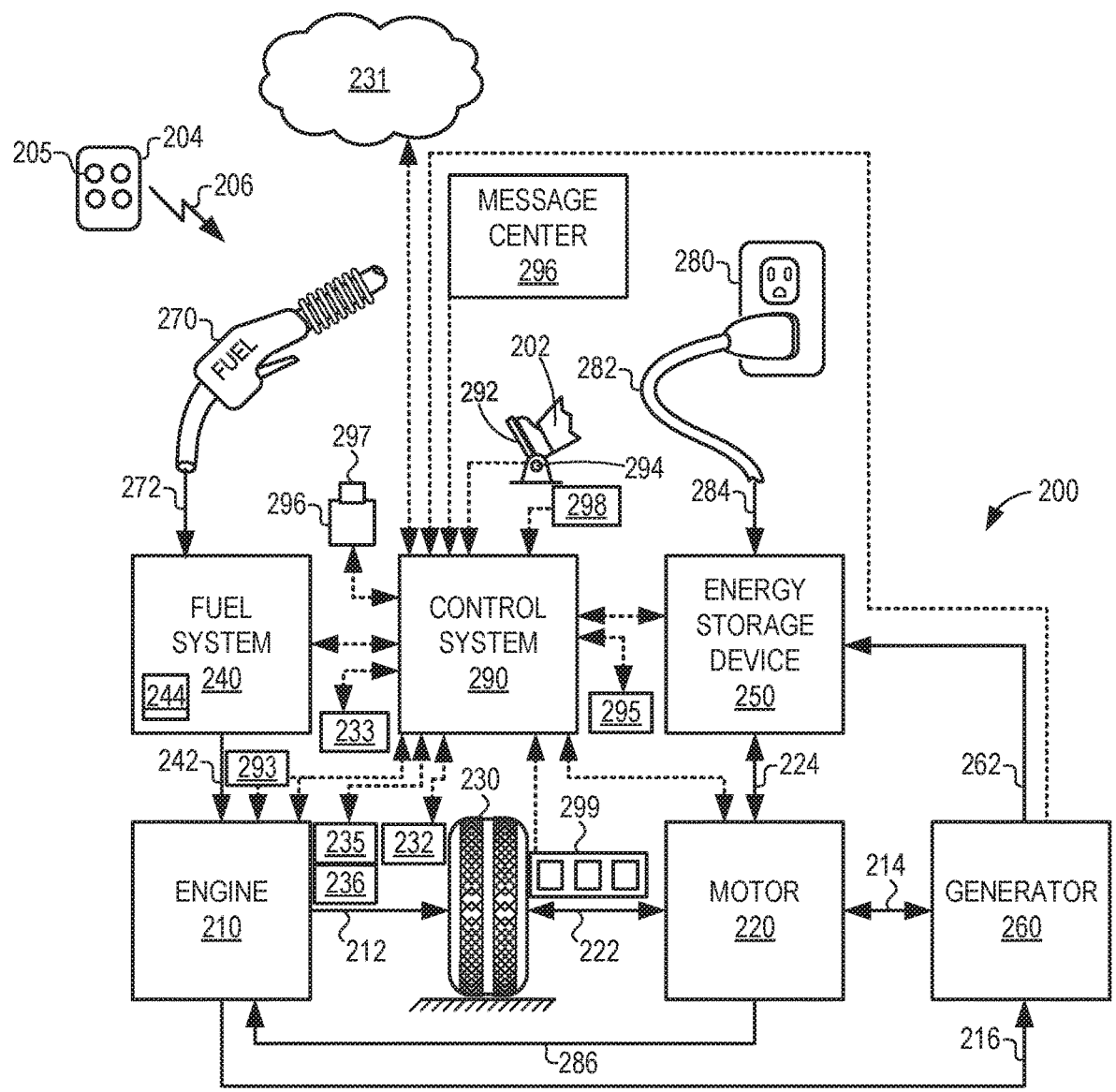
FIG. 2 schematically shows an example vehicle propulsion system.
Figure 3A:
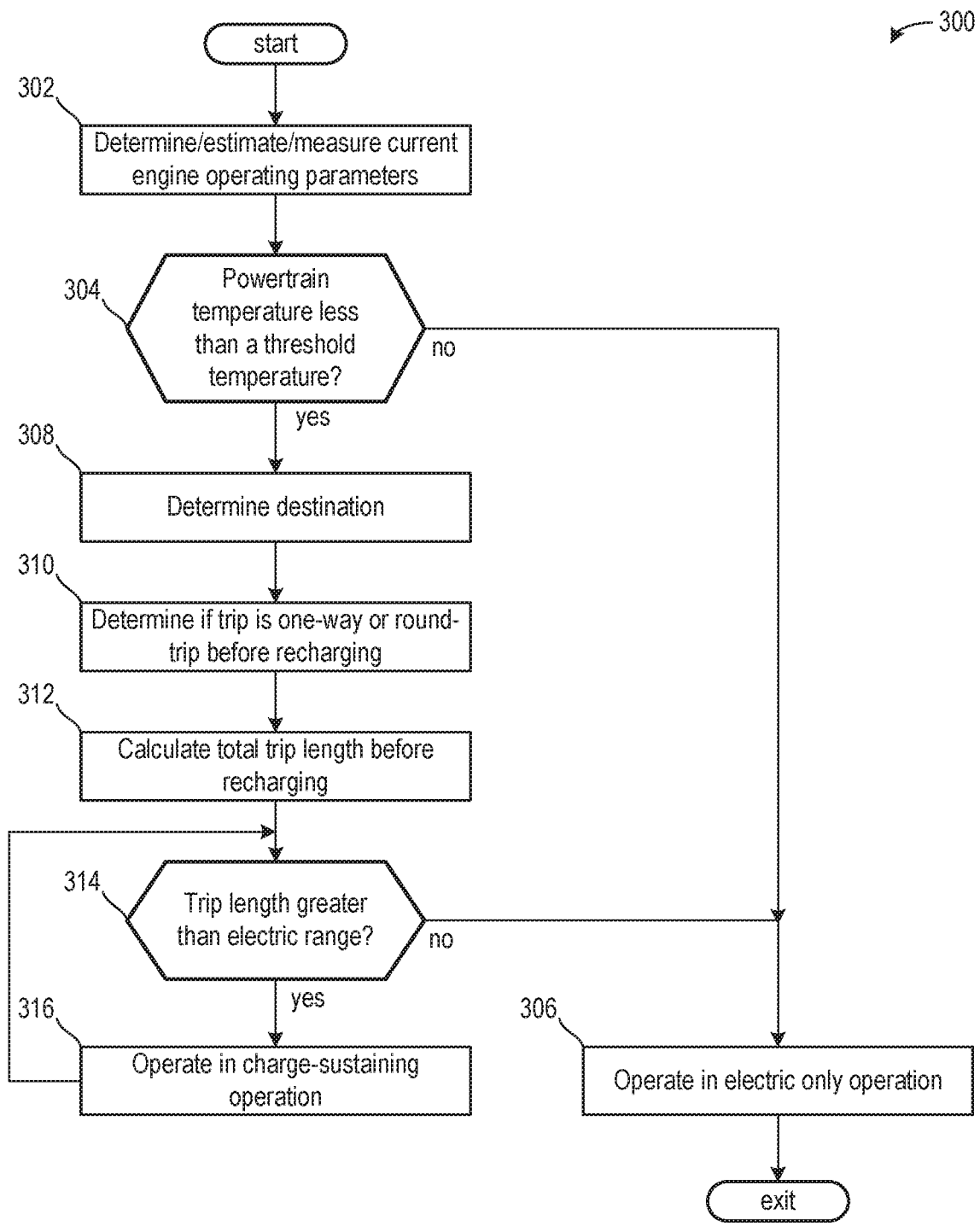
FIG. 3A shows a high-level flow chart illustrating a method for operating the hybrid vehicle.
Figure 3B:
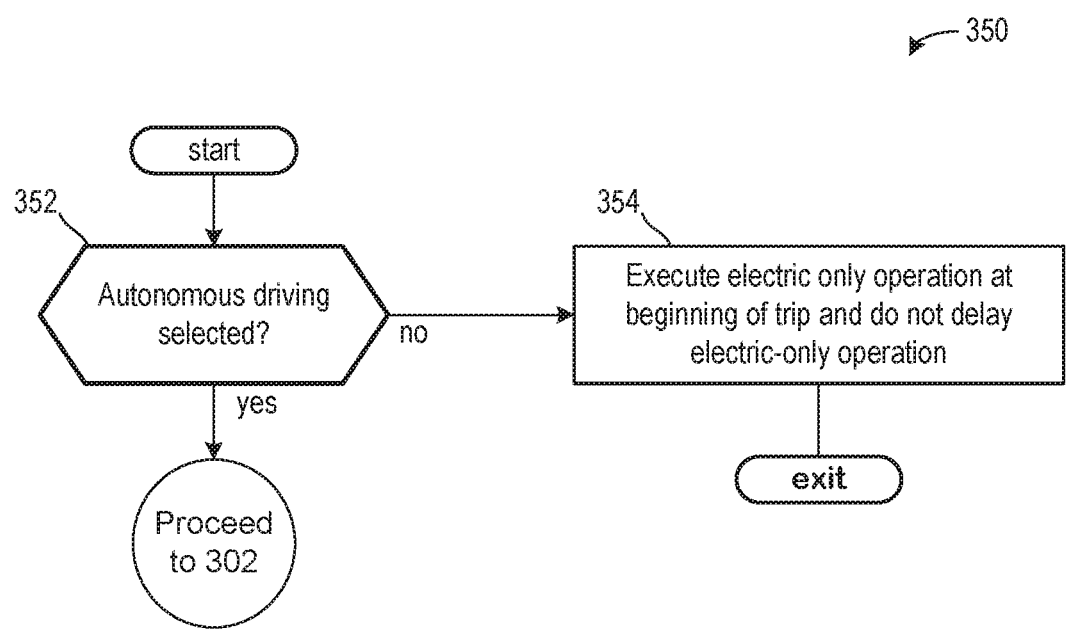
FIG. 3B shows a high-level flow chart illustrating a method for operating an autonomous hybrid vehicle.

The following description relates to systems and methods for delaying an electric-only operation of a hybrid electric vehicle (HEV) in response to a cold-start and/or ambient temperatures being less than a threshold ambient temperature. An example of the HEV is shown in FIGS. 1 and 2. The electric-only operation may be delayed to allow engine waste heat to heat one or more of a vehicle cabin, battery, and lubricant to increase an electric-only operation range. A high-level flow chart illustrating delaying the electric-only operation to increase the electric-only operation range is shown in FIG. 3A. FIG. 3B illustrates a high-level flow chart illustrating delaying the electric-only operation to increase the electric-only operation range in response to autonomous driving being selected.

Figure 4:
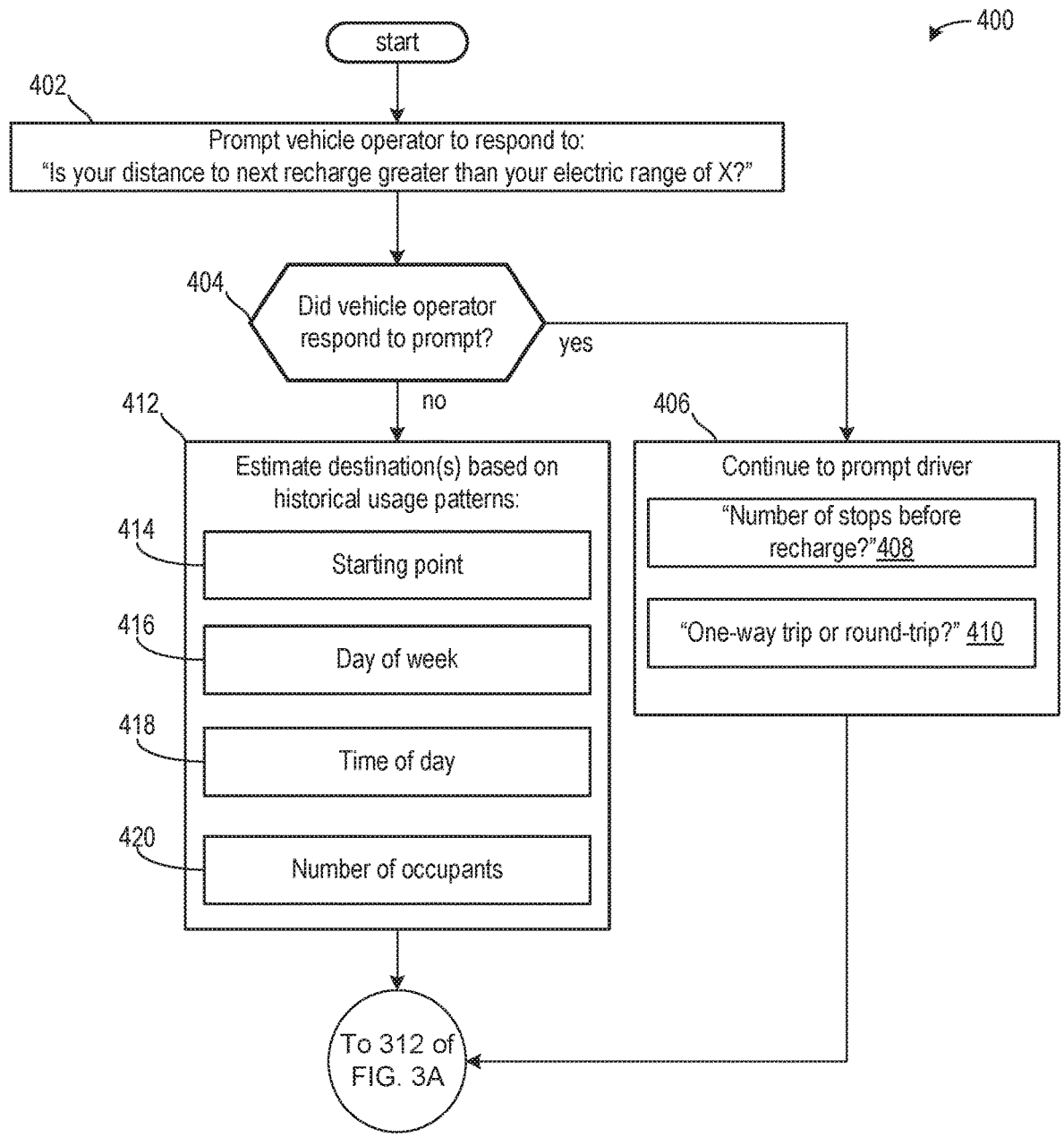
FIG. 4 shows a method for estimating an intended destination based on a vehicle operator input or past driver behaviors.
Figure 5:
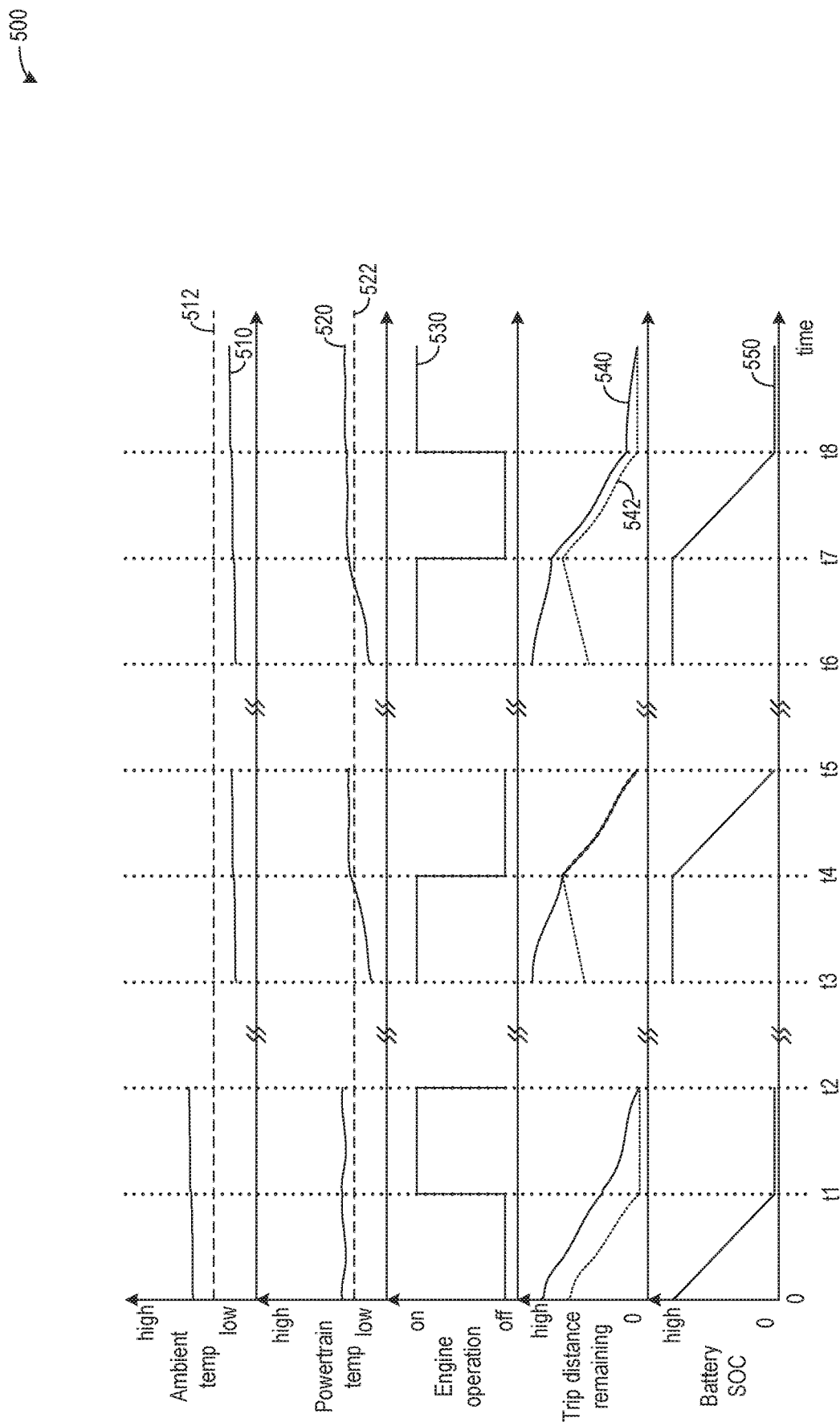
FIG. 5 shows an engine operating sequence illustrating the method of FIGS. 3A and 4 being executed in combination with the engine of FIGS. 1 and 2.
Figure 6A:
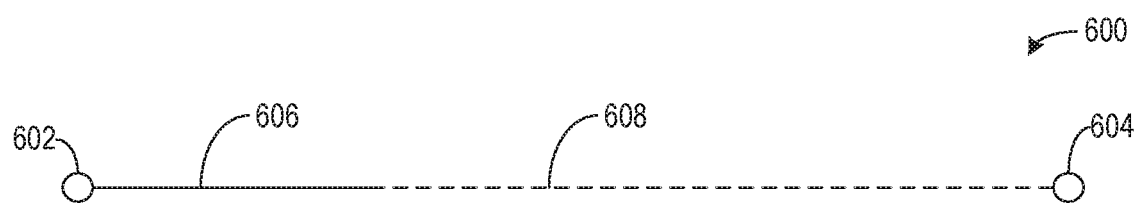
FIGS. 6A, 6B, and 6C show examples of different trips and execution of the electric-only operation.
Figure 6B:
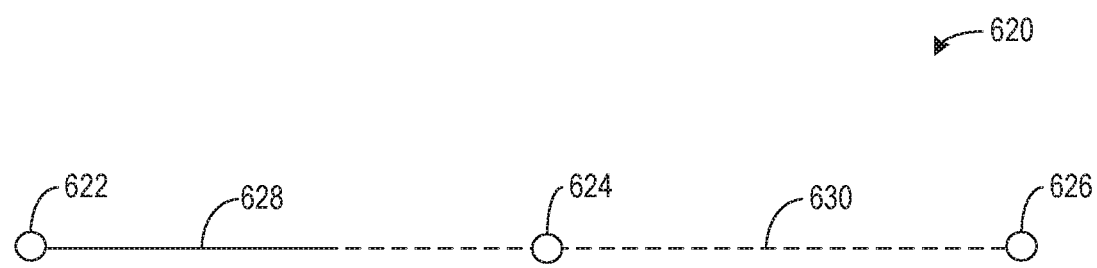
Figure 6C:
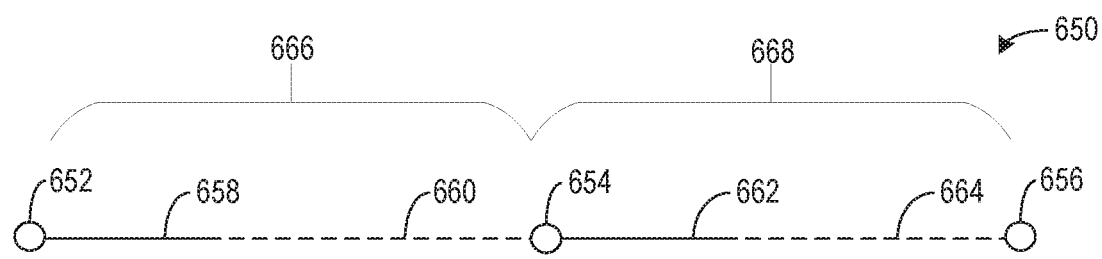

By increasing the electric-only operation range, fuel economy may increase due to a decreased dependence on an engine. The electric-only operation may be delayed if a trip distance to an intended destination is greater than the electric-only operation range. The trip distance may be estimated based on input from a vehicle operator and/or estimations based on historical usage patterns of the HEV, as shown by the method illustrated in FIG. 4. Thus, if the trip distance is less than or equal to the electric-only operation range, the electric-only operation may be initiated at a start of the trip. However, if the trip distance is greater than the electric-only operation range and an ambient temperature is less than the threshold ambient temperature, then the electric-only operation may be delayed. An engine operating sequence illustrating the methods of FIGS. 3A and 4 executed in combination with the hybrid vehicle of FIGS. 1 and 2 is shown in FIG. 5. Therein, the engine operating sequence illustrates three engine start operations for three intended destinations. Examples of different trips and operation of the electric-only operation are shown in FIGS. 6A, 6B, and 6C.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore 20, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore 20 may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58.

Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 59. Electric machine 52 may also be operated as a generator to provide electrical power to charge battery 58, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

FIG. 2 illustrates an example vehicle propulsion system 200. Vehicle propulsion system 200 includes a fuel burning engine 210 and a motor 220. As a non-limiting example, engine 210 comprises an internal combustion engine and motor 220 comprises an electric motor. Engine 210 and motor 220 may be used substantially similarly to engine 10 and electric machine 52 of FIG. 1, respectively. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle (e.g., vehicle 5 of FIG. 1) with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

In another example, the engine may be equipped with a start/stop (S/S) feature 293, wherein the engine 210 may be automatically shut down during times when the vehicle is not moving, or when the vehicle speed is below a threshold speed, when engine speed is below a threshold engine speed, etc. Control system 290 may be connected to engine 210 and S/S feature 293, for performing the start-stop functions. Advantages to the S/S functionality may include an improvement in fuel economy over other vehicles that do not employ such technology. During the start/stop the vehicle may be propelled via its momentum and not by the engine 210 or the motor 220.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a SOC of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated to power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

In still other examples, which will be discussed in further detail below, motor 220 may be configured to rotate engine unfueled in a forward (e.g. default orientation) or reverse orientation, using energy provided via energy storage device 250, exemplified by arrow 286.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. In some examples, control system 290 may be used similarly to controller 12 of FIG. 1. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. Control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnected between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art.

Vehicle system 200 may also include an on-board navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example.

Turning now to FIG. 3A it shows a high-level flow chart illustrating a method 300 for automatically switching from a charge-sustaining operation to an electric-only operation of a hybrid vehicle. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. Herein, the automatically switching may occur independent of vehicle operator actions, as will be described in greater detail below.

In one example, the description of method 300 below is for a vehicle operator selecting to manually drive the hybrid vehicle and thus not selecting an autonomous operation of the hybrid vehicle. However, it will be appreciated by those of ordinary skill in the art that the method 300 may also apply to a hybrid vehicle being selected to autonomously drive. As will be described in greater detail below, some examples of the method 300 where manual driving is selected may further include sub-routine of FIG. 4. Alternatively, some examples of the method 300 where autonomous driving is selected may include where the sub-routine of FIG. 4 is not executed but rather alternative operation is provided.

The method 300 begins at 302, where the method 302 may include determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, and air/fuel ratio.

The method 300 may additionally include determining an electric-only operation range based on one or more of a battery SOC, various components temperatures, ambient temperatures, headlight use, cabin climate control settings, auxiliary device use presenting an electric load, and the like. As an example, the electric-only operation range may increase in response to the battery SOC increasing, ambient temperatures increasing, various component temperatures operating at desired temperatures, headlight use decreasing, cabin climate control settings corresponding to a setting where cabin heating or cooling is not active, and where auxiliary device use decreases such that the electric load on the battery decreases.

The method 300 may proceed to 304, which may include determining if a powertrain temperature is less than a threshold powertrain temperature. The threshold powertrain temperature may be equal to a temperature range based on a desired operating range of the engine, transaxle, and other engine components. The temperature range may be between 180-220° F. The powertrain temperature may be estimated based on one or more of feedback from a temperature sensor, (e.g., ECT temperature sensor 112 of FIG. 1), an exhaust gas temperature sensor (e.g., exhaust gas sensor 126 of FIG. 1), and an ambient temperature sensor. Engine coolant temperature or cylinder head temperature may be measured via a temperature sensor.

In some examples, additionally or alternatively, the threshold powertrain temperature may be based on a cold-start temperature. Thus, if the powertrain temperature is greater than or equal to the threshold powertrain temperature, then the vehicle may not be undergoing a cold-start. In cold ambient temperature, cabin heating may be desired and thus engine operation nearer the engine start may be more favorable that engine operation farther from the engine start, all things being the same. Otherwise, execution of the electric-only operation during the vehicle start during cold ambient temperature may result in a reduction of the electric-only range.

At any rate, if the powertrain temperature is not less than the threshold powertrain temperature, then the method 300 may proceed to 306, which may include operating in an electric-only operation. An actuator of the engine may be adjusted such that combustion in each cylinder of the engine is terminated and the engine is deactivated. Thus, the electric-only operation may include propelling the HEV via only the electric motor and not the engine (e.g., electric motor 220 and engine 210 of FIG. 2). In one example, the electric-only operation uses only the battery and electric motor to propel the HEV. As such, the electric-only operation may generate positive traction at the wheels unlike regenerative braking where the engine is deactivated.

Returning to 304, if the powertrain temperature is less than the threshold temperature, then lubricant, cabin, and vehicle component temperatures may be too low to increase the electric-only operation range to a threshold electric range. The threshold electric range may be substantially equal to 95% or greater of a maximum electric range. As an example, if the maximum electric range is 20 miles for a fully charged battery, then the threshold electric range may be 19 miles. In some examples, the maximum electric range may be a dynamic value which may be adjusted based on weather conditions, battery SOC, cabin settings, electric load of auxiliary devices and the like. Said another way, the electric-only operation range may increase if lubricant, cabin, and vehicle component temperatures increase due to decreased friction and decreased consumption of the battery SOC toward non-propulsion related operations (e.g., cabin heating/cooling). Electric range may depend on one or more of ambient temperature, battery state of charge, and HVAC setting versus ambient temperature/humidity.

In short, if the engine is fully warm (e.g., powertrain temperature greater than the threshold temperature), the vehicle may use the stored electrical energy first, but if the engine is not warm (e.g., powertrain temperature less than the threshold temperature), and the vehicle operator is likely to start it before recharging anyway, it may be optimal to start the engine first because warm engine coolant extends a vehicle's electric range because the demand for electrical heating is reduced with warm engine coolant.

Following determination of the powertrain temperature being less than the threshold temperature, the method 300 may proceed to 308, which may include determining a destination. Determining the destination may include one or more of a vehicle operator input and an estimation based on historical usage patterns of the HEV. Determining the destination in the absence of a vehicle operator input is further described with respect to FIG. 4. At any rate, the destination may be a leg and/or a first stop of the trip where the vehicle operator may recharge the battery. Thus, the destination may include a recharging station configured to charge the battery of the HEV. In this way, stops between a starting location and a recharging destination may not be considered as the destination if they do not comprise a recharging station or do not comprise a vacant position at a recharging station. The recharging station may include the vacant position if a bay of the recharging station is free and able to allow the vehicle operator to recharge the vehicle. In some examples, if the recharging destination does not comprise a vacancy, then the method may further include selecting a different recharging station.

For example, if a first grocery store is determined to be the recharging destination, but the recharging station of the first grocery store does not comprise a vacant recharging bay, then the method may further include determining a second grocery store to be the recharging destination. The second grocery store may be a similar distance away from a current position of the vehicle. Additionally or alternatively, the method may estimate when a recharging bay of the first grocery store may become vacant, wherein the method may further include suggesting one or more stops of the trip to occur before arriving at the first grocery store such that a recharging bay may be vacant.

As another example, if a trip includes a first stop, a second stop, and a third stop, where each of the stops corresponds to a different location, and the first stop does not include a charging station while the second and third stops do include a charging station, then only the second and third stops may be considered as the destination. As such, the battery SOC may be drained upon reaching the second or third stop.

The method 300 may proceed to 310, which may include determining if the trip is a one-way trip or round-trip before charging. The trip may be a one-way trip if the vehicle operator plans to charge the battery at a destination different than a starting location of the vehicle. The trip may be a round-trip if the vehicle operator plans to charge the battery at the starting location after driving the vehicle to a location different than the starting location. In the example of a round-trip, the starting location may be determined to be the destination.

The method 300 may proceed to 312, which may include calculating a total trip length before recharging. In the example of a one-way trip, the total trip length may be a distance between the starting location and the destination, different than the starting location, where charging is estimated to occur. In the example of a two-way trip, the total trip length may be a round-trip distance totaling distances between the starting location, each stop along the round-trip, and back to the starting location.

The method 300 may proceed to 314, which may include determining if the total trip length is greater than the electric-only operation range. If the total trip length is not greater than the electric range, then the method 300 may proceed to 306, which may include operating in the electric-only operation, as described above. If the total trip length is less than or equal to the electric-only operation range, then the method 300 may proceed to 316, which may include operating in a charge-sustaining operation, wherein the HEV may be at least partially propelled via the engine combusting. Furthermore, the charge-sustaining operation may utilize waste heat from the engine to heat one or more of the transaxle, battery, cabin, engine oil and lubricants, and other engine components. This may increase the electric-only operation range. The method may continue to monitor if the total trip length is greater than the electric-only operation range. If the trip length is not greater than the electric-only operation range, then the method 300 may proceed to 306 to operate in the electric-only operation.

Additionally or alternatively, the electric-only operation may be initiated following the powertrain temperature no longer being less than the threshold temperature. That is to say, operation may switch from the charge-sustaining operation to the electric-only operation in response to the powertrain temperature being greater than or equal to the threshold temperature, even if the total trip length is greater than the electric-only operation range. Switching from the charge-sustaining mode to the electric-only operation mode may be automatic, wherein the automatic switching may occur in the absence of a user input. In one example, the switching occurs during vehicle locomotion, where the engine is deactivated and no longer combusts and the electric motor is activated and power is supplied thereto via a battery without user input. Thus, the user may continue to depress an accelerator pedal or brake pedal and may not depress a button or adjust an engine setting via an infotainment system to switch from the charge-sustaining operation to the electric-only operation.

Turning now to FIG. 3B, it shows a high-level flow chart illustrating a method 350 for adjusting the electric-only operation of the vehicle based on one or more conditions including autonomous driving.

The method 350 begins at 352, which includes determining if autonomous driving is selected. Autonomous driving may be selected by a vehicle operator through a navigation system, infotainment system, smart phone, cell phone, GPS device, or the like. Autonomous driving may include propulsion of the vehicle being executed without vehicle operator inputs and responsive to vehicle sensors and communication information received at the vehicle. For example, an autonomously driven vehicle may accelerate, brake, turn, change lanes, and park without inputs from the vehicle operator except for a desired destination. A controller, such as controller 12 of FIG. 1, may signal to various actuators of the vehicle based on feedback from various sensors of the vehicle to adjust one or more driving parameters. In some embodiments, the controller may signal to an actuator of the brake pedal to depress the brake pedal in response to a proximity sensor and/or imaging device detecting an object being within a threshold proximity of the vehicle.

At any rate, if autonomous driving is not selected, then the method 350 may proceed to 354, which may include executing electric-only operation at the beginning of the trip. Thus, the electric-only operation may not be delayed. Furthermore, in response to the vehicle operator selecting to manually drive the vehicle, the vehicle operator may not receive one or more prompts requesting information regarding a distance to one or more of a desired destination and next recharge. In other words, if one decides that there is no information as to likely length of trip, default to using the electric-only mode first, anticipating the more likely case of distance driven before re-charging being less than electric range.

In some examples, additionally or alternatively, 354 may additionally include executing method 300 of FIG. 3A while the electric-only operation is executed at the beginning of the trip. Once the vehicle operator inputs the recharging location and/or distance to the recharging location, then the method may determine if it is economically desired to continue operating in the electric-only operation or terminate the electric-only operation to allow the electric-only operation to be executed at a later stage of the trip. For example, if a trip is 25 miles and a current electric-only range is 15 miles and the electric-only range is executed at the start of the trip, then a vehicle operator may input after 5 miles of electric-only operation driving that the recharging location is 20 miles away and outside of the electric-only range. Following the vehicle operator input, it may be decided to terminate the electric-only operation and execute the electric-only operation if it is estimated that the electric-only range may increase at a later portion of the trip. In the present example, 10 miles of the current electric-only range may remain once the vehicle operator inputs the recharging location. The vehicle may estimate that by terminating the electric-only operation and switching to a charge-sustaining operation that the electric-only range may increase to a higher range (e.g., 18 miles). Alternatively, if the current electric-only range may not increase later in the trip, then the vehicle may continue to operate in the electric-only operation to begin the trip. At the condition when you can finish the trip in electric-only mode, do so.

If autonomous driving is selected, then the method 350 may proceed to 302 of method 300. In some examples, execution of method 300 may differ if manual driving or autonomous driving is selected. If manual driving is selected, then execution of method 400, described below, may be done in conjunction with method 300 as information from the vehicle operator may not be submitted without one or more prompts. If autonomous driving is selected, then method 400 may not be executed with method 300, as autonomous driving may demand trip information including addresses and expected recharge events without utilizing the prompts described in FIG. 4. In autonomous driving, it is assumed that the auto driver (a machine) is aware of the intended destination.

Turning now to FIG. 4, it shows a method 400 for determining and/or inferring a destination of a current trip. In one example, the method 400 may be a sub-routine executed during 308 and 310 of method 300 of FIG. 3A. In one example, method 400 is not executed if autonomous driving is selected with respect to method 305 of FIG. 3B.

The method 400 begins at 402, which may include prompting a vehicle operator to respond to an alert. An infotainment system, navigation system, GPS device, or the like may display the prompt on a screen to the vehicle operator. The prompt may read, "Is your distance to next recharge greater than your electric range x?" where x may be adjusted based on an estimated, current electric-only operation range. The vehicle operator may select yes or no rather than inputting an address or selecting a destination through the infotainment system. By allowing the vehicle operator to provide input by simply answering with a yes or a no, a likelihood of vehicle operator input may increase. It will be appreciated by those of ordinary skill in the art that the vehicle operator may provide feedback via voice and/or touch commands. Additionally or alternatively, the vehicle operator may provide feedback via a cell phone, smart phone, tablet, or other device connected to the infotainment system or similar system of the vehicle via Bluetooth, Wi-Fi, or the like.

Additionally or alternatively, the prompt may further include distances to commonly traveled locations. In some examples, the commonly traveled locations may be locations comprising a charge station and stored in the infotainment system. In some examples, additionally or alternatively, the commonly traveled locations may correspond exactly to a present vehicle operator. That is to say, if the vehicle may comprise two different vehicle operators, a first vehicle operator and a second vehicle operator, then the commonly traveled locations may correspond to the first vehicle operator if the first vehicle operator is positioned in a driver seat of the vehicle. The vehicle operator may be determined based on one or more of weight, seat settings, height, voice, rear view mirror position, cabin settings, and the like.

For example, as a vehicle operator is positioned onto the driver seat, the controller may determine which of the vehicle operators of the vehicle is positioned to operate the vehicle. The controller may determine if a destination has been input by the vehicle operator into the infotainment system or an external device (e.g., a smart phone) connected to the infotainment system. If the destination has not been input by the vehicle operator, then the screen may be adjusted to display an electric-only operation range. Specifically, the screen may be adjusted to display, "Is your distance to next recharge greater than your electric range of 20 miles?" The screen may further display "yes" and "no" responses. Additionally or alternatively, the screen may further display distances of commonly traveled locations, wherein the commonly traveled locations may correspond to the vehicle operator, time of day, number of occupants, and the like. For example, the commonly traveled locations may be displayed as "Home, 11 miles", "Work, 15 miles", "Supermarket, 23 miles", to allow the vehicle operator to quickly determine if the distance to next recharge is greater than the electric-only operation range.

The method 400 may proceed to 404, which may include determining if the vehicle operator responded to the prompt. The response may be a voice response or touch response. Additionally or alternatively, the response may be through a smart phone or other external device connected to the vehicle. The external device may comprise an address input thereto where the infotainment system may determine if charging may occur at the address and if a distance from a current location to the address is greater than the electric-only operation range. If the vehicle operator did respond to the prompt, then the method 400 may proceed to 406 which may include continuing prompting the vehicle operator for additional details regarding the trip.

Continuing to prompt the vehicle operator may further include displaying, "Number of stops before recharge?" at 408, and "One-way trip or round-trip?" at 410. Thus, the continued prompts may include simple responses as well. For example, the "Number of stops before recharge?" may further include numerical responses such as "1", "2", "3", and "4 or more". The "One-way trip or round-trip?" prompt may further include responses such as "yes" and "no". In this way, the prompts may be less cumbersome than prompts requesting an address of the intended destination(s) or a time spent at each or other inputs which may demand typing. By doing this, a likelihood of vehicle operator response may increase, thereby allowing the controller to determine a desired operation of the vehicle for the trip. The method 400 may proceed to 312 of FIG. 3A.

Returning to 404, if the vehicle operator did not response to the prompt, then the method may proceed to 412 which may include estimating one or more destinations based on historical usage patterns. The historical usage patterns may include a starting point at 414, wherein the starting point may be determined based on GPS data or the like. The historical usage patterns may further include a day of the week at 416 and time of day at 418. For example, if the day of week is Monday and the time of day is 7:30 AM, then estimating the destination may include that the destination is a work place. Based on previous driver behaviors, the method may determine if the work place is a destination where a charging is likely to occur. As an example, if charging is not likely to occur upon reaching the work place, then the method may further include estimating a location or locations following the workplace. If the location following the work place is the same as the starting location, then the trip may be a round-trip and the method may include determining a distance of the round-trip.

As another example, estimating the destination may further include a number of occupants at 420. As an example, if the number of occupants is one and the day of the week is Monday and the time of day is 7:30 AM, then the estimated destination may be a work place. However, if the number of occupants is two or more and the day of the week is Monday and the time of the day is 7:30 Am, then a first estimated destination may be a school, and a second estimated destination may be the work place. The school may not be inferred as a charging destination based on historical usage data, which may indicate that a duration of time spent at the school is below a threshold duration, where the battery SOC may not increase. Thus, even if the school comprises a charging station, it may not be interpreted as a destination where a charge may occur.

Following estimation of the destination where charging may occur, the method 400 may proceed to 312 of FIG. 3A.

Thus, the methods of FIGS. 3A and 4 illustrate instructions stored on non-transitory memory of a controller (e.g., controller 12 of FIG. 1), that when executed enable the controller to request data from a vehicle operator regarding a distance between a starting location and a next recharge. The request may be prompted in response to an absence of an address and/or destination being input by the vehicle operator. If the vehicle operator does not respond to the request, then the controller may estimate a destination where the next recharge may occur. The distance between the starting location and the next recharge may be compared to an electric-only operation range, which may indicate a range of the vehicle using the electric motor and not the engine. If one or more of the distance is greater than the electric-only operation range and a powertrain temperature is less than a threshold temperature, then the electric-only operation may be delayed and the trip may begin using the engine to propel the vehicle in a charge-sustaining operation. The charge-sustaining operation may continue to be executed until one or more of the distance is less than or equal to the electric-only operation range and the powertrain temperature is greater than or equal to the threshold temperature, where the vehicle may automatically switch from the charge-sustaining operation to the electric-only operation independent of the vehicle operator input. That is to say, while the vehicle is propelled on a road, the controller may deactivate the engine and activate the electric motor, thereby beginning to drain battery SOC, without input from the vehicle operator excluding accelerator and brake pedal tip-in.

In some embodiments, the vehicle comprising the controller with non-transitory with instructions stored thereon for executing the methods 300 and 400 of FIGS. 3A and 4, respectively, may be further configured to drive autonomously, as shown in method 350 of FIG. 3B. The vehicle operator may provide an input indicating that the vehicle operator desires the vehicle to drive autonomously. Autonomous driving may include the vehicle propelling, steering, and braking without input from the vehicle operator. The vehicle operator may interrupt autonomous driving by depressing the accelerator pedal or the brake pedal.

In some examples, the methods 300 and 400 may only be executed when autonomous driving is not requested. Autonomous driving may demand the vehicle operator to input a destination, which may assist the controller in comparing a distance to a recharging station to a current electric-only operation range. In one example, the electric-only operation is delayed only when autonomous driving is desired. Thus, in some examples, the electric-only operation may not be delayed when non-autonomous driving is selected.

In some examples, during the electric-only operation, a driver demand may exceed a torque output of the electric motor and the engine may be at least partially reactivated to assist the electric motor to meet the driver demand. In such an example, the electric motor output may be operated to a threshold output (e.g., 100% output) and the engine may be operated based on a difference between the electric motor output and the driver demand. Thus, the vehicle may mix the engine power with electric power to meet the increased driver demand. The engine may be deactivated once the driver demand decreases to a driver demand which may be met by only the electric motor. In such an example, the electric-only operation may be interrupted based on accelerator pedal inputs from the vehicle operator, where the engine may be activated (e.g., charge-sustaining operation and/or hybrid operation). The vehicle may return to electric-only operation based on vehicle operator inputs corresponding to a driver demand which may be met solely by the electric-only operation, where the vehicle operator inputs may include an accelerator pedal being less depressed. Thus, in some examples, the vehicle may automatically switch from the charge-sustaining operation to the electric-only operation, where automatically switching is independent of vehicle operator inputs, and where following the automatic switching the vehicle may switch from the electric-only operation to the charge-sustaining operation based on an accelerator pedal position.

Turning now to FIG. 5, it shows an engine operating sequence 500 illustrating the methods 300 and 400 of FIGS. 3A and 4, respectively, being implemented with the vehicles of FIGS. 1 and 2. The engine operating sequence 500 comprises a plot 510 illustrating an ambient temperature and a dashed line 512 representing a threshold ambient temperature, a plot 520 illustrating a powertrain temperature and a dashed line 522 representing a threshold powertrain temperature, a plot 530 illustrating an engine operation, a plot 540 illustrating a trip distance remaining and a dashed plot 542 illustrating an electric-only operation range, and a plot 550 illustrating a battery SOC. The threshold ambient temperature may be equal to an ambient temperature where a cold-start may be likely. Additionally or alternatively, the threshold ambient temperature may be based on a fixed temperature (e.g., 10° C.). The threshold powertrain temperature may be based on a desired operating temperature of the powertrain, which may be substantially equal to 85° C. Time may increase from a left to a right side of the figure.

Prior to t1, a vehicle operator may embark on a first trip to an intended destination where charging is expected to occur. To begin the trip, the ambient temperature is greater than the threshold ambient temperature (plot 510 and dashed line 512, respectively). The powertrain temperature (plot 520) is greater than the threshold powertrain temperature (plot 522). In the example of the first trip, the engine operation (530) is off and/or deactivated to begin the trip. As such, despite the trip distance remaining (plot 540) being greater than an electric-only operation range (plot 542), the battery SOC (plot 550) decreases from a high SOC to 0 to begin the first trip. The electric-only operation may be implemented to begin the first trip due to the powertrain temperature being greater than the threshold powertrain temperature, which may indicate that the electric-only operation range may be equal to a threshold electric range (e.g., within 95% of a maximum electric range under current operating conditions). As described above, the maximum electric range and/or threshold electric range may be dynamic values which may be adjusted based on at least one or more of weather, battery SOC, driver behavior, electric load of auxiliary devices, and the like.

At t1, the battery SOC may be substantially equal to zero and the electric-only operation range may correspondingly decrease to zero. As such, the engine operation may switch to ON and/or an active operation where at least some of the cylinders of the engine are firing. Between t1 and t2, the engine may be used to complete a remainder of the first trip to reach the first intended destination. At t2, the trip distance remaining to the first intended destination decreases to zero, indicating that the vehicle has reached the first intended destination.

Thus under warm ambient and warm engine conditions, the vehicle consumes the electric range first since there is not a compelling fuel consumption advantage to using the engine first.

Between t2 and t3, time may pass (e.g., hours, days, etc.) where the vehicle may be plugged-in to a charging station to recharge the battery SOC to a relatively high SOC (e.g., 100% charged). At t3, a second trip may begin, where the ambient temperature is less than the threshold ambient temperature and the powertrain temperature is less than the threshold powertrain temperature. As such, a cold-start may be occurring. During the cold-start, lubricant temperatures may be relatively low which may lead to increased frictional forces when propelling the vehicle. Additionally, a cabin temperature may be relatively low and the vehicle operator may desire cabin heating. The electric-only operation range may be less than each of the threshold electric range and the remaining trip distance. The electric-only operation range may increase by allowing at least the cabin temperature and powertrain temperature to increase via waste heat from the engine. Thus, the second trip may begin with the engine being ON and the battery SOC remaining relatively high such that battery SOC may not be consumed.

Between t3 and t4, the electric-only operation range increases toward the threshold electric range as the powertrain temperature increases toward the threshold powertrain temperature. Thus, frictional forces decreasing fuel efficiency may decrease as lubricant warms-up. The engine waste heat may be additionally allocated to heat the cabin, possibly decreasing a magnitude of a cabin heating demand during future operating conditions during the trip. The trip distance remaining may continue to decrease as the engine propels the vehicle while operating in the charge-sustaining mode. In this way, using the engine in the first portion of the trip instead of the last results in more distance being covered in electric-only mode than if electric mode was used first.

At t4, the powertrain temperature is greater than or equal to the threshold powertrain temperature. Furthermore, the trip distance remaining is substantially equal to the electric-only operation range. As such, the engine may be deactivated and an electric motor may be activated such that battery SOC may begin to decrease. In one example, the electric-only operation range may be substantially equal to the threshold electric range at t4. In another example, the electric-only operation range may be less than the threshold electric range at t4. At any rate, the controller may prioritize depleting the battery SOC upon reaching the recharging destination while decreasing fuel consumption to a lowest value. Thus, the intersection of the trip distance remaining and the electric-only operation range may represent a point of the trip at which the electric motor may independently propel the vehicle a furthest distance under the conditions present during the trip.

Between t4 and t5, the engine remains off and the vehicle may operate in the electric-only operation where the trip distance remaining decreases due to only electric motor propulsion of the vehicle. As shown, the electric-only operation range may track the trip distance remaining between t4 and t5, indicating the two values are substantially equal. The battery SOC decreases from a high SOC toward zero.

At t5, the electric-only operation range, the trip distance remaining, and the battery SOC may decrease to zero. As such, the battery SOC may be drained and reach zero upon arriving at the destination where recharge may occur. In this way, a mileage traveled via the battery SOC may be maximized due to the utilization of waste heat from the engine prior to the electric-only operation. Between t5 and t6, the vehicle may be deactivated and the battery may recharge to replenish the battery SOC.

At t6, the ambient temperature relatively low and less than the threshold ambient temperature. As a result, the powertrain temperature is less than the threshold powertrain temperature, indicating a cold-start is occurring. As described above, forces during the cold-start (e.g., friction) and desired cabin heating may decrease the electric-only operation range. Thus, to increase a number of miles traveled during the electric-only operation, the engine may be activated to begin the trip, where waste heat from the engine may be used to warm-up at least the powertrain, cabin, lubricant, and battery.

Between t6 and t7, the powertrain temperature increases to a temperature above the threshold powertrain temperature. The electric-only operation range continues to increase as waste heat from the engine warms-up various vehicle components. The trip distance remaining decreases as the engine propels the vehicle with little to no assistance from the battery. As such, the battery SOC remains substantially constant and substantially equal to a relatively high battery SOC (e.g., greater than or equal to 95%).

At t7, the powertrain temperature remains above the threshold powertrain temperature. The electric-only operation range increases to a relatively high electric-only operation range and may be equal to the threshold electric range. As a result, the vehicle may shift to the electric-only operation by deactivating the engine and beginning to consume battery SOC.

Between t7 and t8, the vehicle operates in the electric-only operation and the trip distance remaining and electric-only range decrease. At t8, the battery SOC may decrease to zero, resulting in the electric-only operation range also decreasing to zero. However, the trip distance remaining is not equal to zero and the intended destination is not yet reached. As such, the engine is reactivated as the vehicle switches from electric-only operation to charge-sustaining operation.

After t8, the trip distance remaining decreases to zero as the engine is used to propel the vehicle to the intended destination.

Turning now to FIG. 6A, it shows a first trip 600 extending from starting location 602 to intended destination 604. In the example of FIG. 6A, a recharge is anticipated and/or expected at the intended destination 604. This may be based on vehicle operator input or an estimation based on historical data.

A distance of the first trip 600, measured from the starting location 602 to the intended destination 604 may be greater than a threshold electric range or a maximum electric range of the vehicle. For example, the first trip distance 600 may be 30 miles and the maximum electric range may be 20 miles. Furthermore, an electric-only operation range at the starting location 602 may be less than the threshold electric range due to a powertrain temperature or other condition. Thus, the first trip 600 begins with a charge-sustaining operation where the engine propels the vehicle and battery SOC is maintained, as shown by solid line 606. Once waste heat from the engine sufficiently heats one or more of the powertrain, lubricant, cabin, battery, and other vehicle components such that an electric-only operation range exceeds a threshold electric range (e.g., within 95% or more of a maximum electric-only operation range), then the vehicle may automatically adjust from the charge-sustaining operation to the electric-only operation, shown by dashed line 608. Additionally or alternatively, the vehicle may switch from the charge-sustaining operation to the electric-only operation based on a remaining distance being less than or equal to a current electric-only operation range. Thus, the vehicle may switch in response to the electric-only range being greater than the threshold electric range or if a current electric-only operation range is greater than or equal to the remaining distance. At any rate, the first trip 600 may be completed in the electric-only operation. In some examples, the battery SOC drains to substantially zero (e.g., less than 5% total SOC) upon arriving at the intended destination 604. In this way, fuel consumption during the first trip 600 may be reduced to a lowest possible value by maximizing the electric-only operation range to propel the vehicle for a highest possible value relative to conditions during the first trip 600.

In some examples of the first trip 600, the electric-only operation, where positive traction is supplied to the wheels to propel the vehicle, may be avoided and not used until after an electric-only operation range is equal to a remaining trip distance to a recharging station. In one example, the electric-only operation is completely avoided and not used until only after the electric-only operation range is equal to the remaining trip distance to the charging station for a trip comprising a total trip distance of greater than the electric-only operation range.

In some examples, the charging station may be a first charging station, where the first charging station may be adjusted to a second charging station different than the first. The adjusting may occur in response to the first charging station comprising no vacancy such that a recharge may at the first charging station may not occur. The controller may determine a distance to the second charging station, wherein the distance may be substantially similar to a distance to the first charging station. However, if the distance to the second charging station is greater than the distance to the first charging station, then the electric-only operation may be further delayed. In some examples, if the adjusting occurs following initiation of the electric-only operation, then the vehicle may adjust engine operating parameters and activate the engine to operate in a charge-sustaining mode. The electric-only operation may be restarted once the remaining trip distance to the second charging station is equal to a remaining electric range.

Additionally or alternatively, if the electric-only operation range is miscalculated and is determined to be less than the remaining trip distance to a recharging station following activation of the electric-only operation, then the controller may determine if a different charging station is within the electric-only range. In this way, the electric-only operation may remain active, despite the miscalculation.

Turning now to FIG. 6B, it shows a second trip 620 extending from a starting location 622 to a final destination 626 where a charge is likely to occur. A non-charging location 624 may be between the starting location 622 and the final destination 626. A recharge may not occur at the non-charging location 624 such that the battery SOC may not increase.

The second trip 620 may begin in the charge-sustaining operation where the engine propels the vehicle and the battery SOC remains relatively unchanged, as shown by solid line 628. After a duration of time, waste heat from the engine may sufficiently heat the powertrain, cabin, and other vehicle components such that a current electric-only operation range may be substantially equal to a remaining distance of the second trip 620. Additionally or alternatively, the current electric-only operation range may be greater than or equal to the threshold electric range. The remaining distance may be measured from a current location to a destination where a charge may occur. As such, the remaining distance is measured from the final destination 626 to a nearest end of the solid line 628. As a result, the vehicle may shift to the electric-only operation range, which may propel the vehicle to the non-charging location 624. The vehicle may be shut-off at the non-charging location. However, a duration of the shut-off may be less than a threshold duration (e.g., less than 30 minutes) such that temperature changes of the powertrain and other vehicle components may not significantly impact the electric-only operation range. Significantly impacting the electric-only operation range may include decreasing the electric-only operation range by 10% or greater. Thus, the vehicle may restart in the electric-only operation following start of the vehicle after the non-charging location 624.

Turning now to FIG. 6C, it shows a third trip 650 substantially similar to the second trip 620. However, the third trip 650 may be different in that the non-charging location 654 may significantly impact the electric-only operation range. That is to say, powertrain, lubricant, battery, and cabin temperature may decrease at the non-charging location 654 to decrease the electric-only operation range to a range less than the threshold electric range. In the example of the third trip 650, it may be desired to divide the electric-only operation between a first leg 666 and a second leg 668 of the third trip 650. The first leg 666 extends from a starting location 652 to the non-charging location 654. The second leg 668 extends from the non-charging location 654 to a final destination 656. Dividing the electric-only operation between the first leg 666 and the second leg 668 may include finishing each of the legs in the electric-only operation based on a current electric-only operating range and a remaining distance.

For example, the vehicle may determine that the third trip 650 is 30 miles, measured from the starting location 652 to the final destination 656. The non-charging location 654 may be midway between the starting location 652 and the final destination 656 such that each of the first leg 666 and the second leg 668 is 15 miles. A current electric-only operation range at the starting location 652 may be substantially equal to 15 miles. However, a maximum electric range may be substantially equal to 20 miles. As such, the vehicle may operate the first five miles of the first leg 666 in the charge-sustaining mode such that waste heat from the engine may heat various vehicle components and increase the electric-only operation range. The vehicle may deactivate the engine and begin operating in the electric-only operation, shown by dashed line 660, 10 miles away from the non-charging location 654. That is to say, at the end of solid line 658 where the electric-only operation begins, the electric-only range may be substantially equal to 20 miles. However, only 10 miles of the 20 miles may be used to reach the non-charging location 654. Thus, a battery SOC may be substantially equal to 50% at the non-charging location 654.

At the non-charging location, the powertrain temperature and other vehicle component temperatures may decrease such that a current electric-only operation range may be substantially equal to 7.5 miles. However, the maximum electric-only operation range at the non-charging location may be equal to 10 miles. As such, the second leg 668 may begin in the charge-sustaining operation with the engine propelling the vehicle, as shown by solid line 662. Once the current electric-only operation range increases to the maximum electric-only operation range, the vehicle may switch from the charge-sustaining operation to the electric-only operation. In the example of FIG. 6C, the maximum electric-only operation range is reached after propelling the vehicle five miles. Thus, the remaining 10 miles of the second leg 668 may be completed in the electric-only operation, as shown by dashed line 664. Upon reaching the final destination 656, the battery SOC may reach zero.

By splitting the electric-only operation across the first and second legs 666, 668, fuel consumption was minimized. More specifically, previous examples of hybrid vehicles may have conducted the first leg 666 in the electric-only operation, thereby demanding that the entirety of the second leg 668 be conducted in the charge-sustaining mode, resulting in 15 miles of electric propulsion and 15 miles of engine propulsion. However, by utilizing the waste heat of the engine and delaying the electric-only operation, the vehicle in the example of FIG. 6C was able to travel 20 miles with electric propulsion and 10 miles with engine propulsion, thereby increasing fuel economy by up to 50% compared to previous examples.

In this way, fuel consumption may be reduced for a trip comprising a distance greater than an electric range of a vehicle. An electric-only operation of the vehicle may be delayed until the electric range reaches a threshold electric range, where the vehicle may deactivate the engine and initiate the electric-only operation. The technical effect of delaying the electric-only operation is to increase an electric-only range via waste heat from the engine to allow the electric-only operation to propel the vehicle further during the trip than it would had the electric-only operation been initiated at a start of the trip. By doing this, the battery SOC may be depleted to zero upon arriving at a destination where a recharge may occur, decreasing fuel consumption as much as possible.

An example of a system for a hybrid vehicle comprising an internal combustion engine and an electric motor, and a controller with computer-readable instruction stored on non-transitory memory thereof that when executed enable the controller to switch from engine propulsion to electric motor propulsion in response to a remaining trip distance being equal to an electric range. A first example of the system further includes where the controller further includes instruction to switch when a powertrain temperature is greater than or equal to a threshold powertrain temperature. A second example of the system, optionally including the first example, further includes where the switch is automatic and independent of vehicle operator inputs. A third example of the system, optionally including the first and/or second examples, further includes where the electric motor is coupled to a battery, and where a state of charge of the battery is maintained when the hybrid vehicle is propelled by the engine. A fourth example of the system optionally including one or more of the first through third examples, further includes where the remaining trip distance is measured from a current location of the hybrid vehicle to an intended destination. A fifth examples of the system optionally including one or more of the first through fourth examples, further includes where the intended destination comprises a recharging station, and where a state of charge of a battery of the hybrid vehicle is at least partially replenished at the recharging station.

An example of a method for a hybrid vehicle comprising an engine and an electric motor, the method comprising delaying an electric-only operation of the hybrid vehicle until an electric-only range is equal to a remaining trip distance during a trip from a starting location to a recharging location, and where the electric-only operation is initiated by deactivating the engine and activating the electric motor independently of vehicle operator input outside of accelerator and brake pedal actuation. A first example of the method further includes where a total trip distance is measured from the starting location to the charging location, and where the electric-only range is less than the total trip distance. A second example of the method, optionally including the first example, further includes where a powertrain temperature is greater than a threshold powertrain temperature when the electric-only operation is initiated. A third example of the method, optionally including the first and/or second examples, further includes a prompt being displayed to a vehicle operator at the starting location, the prompt requesting an input from the vehicle operator regarding an expected distance from the starting location to the charging location.

An example of a system comprising a hybrid-electric vehicle comprising an engine and an electric motor coupled to a battery and a controller with computer-readable instructions stored on non-transitory memory thereof that when executed enable the controller to request input from a vehicle operator regarding a total trip distance, where the total trip distance is measured from a starting location to a recharging location, delay an electric-only operation of the hybrid-electric vehicle in response to the total trip distance being greater than an electric-only range, and activate the electric-only operation in response to the electric-only range being equal to a remaining trip distance, where the remaining trip distance is measured from a current location to the recharging location. A first example of the system further includes where the remaining trip distance is less than the total trip distance. A second example of the system, optionally including the first example, further includes where the controller further includes instructions to propel the vehicle via the engine for a difference between the total trip distance and the remaining trip distance, and where the electric-only operation is activated automatically. A third example of the system, optionally including the first and/or second examples, further includes where a state of charge of the battery is decreased to zero when the vehicle reaches the recharging location. A fourth example of the system optionally including one or more of the first through third examples, further includes where the battery is drained continuously once the electric-only response is activated until the vehicle reaches the recharging location. A fifth example of the system optionally including one or more of the first through fourth examples, further includes where controller further includes instructions to propel the vehicle via the engine for a difference between the total trip distance and the remaining trip distance, and where waste heat from the engine is used to warm-up one or more of a powertrain, a vehicle cabin, and the battery. A sixth example of the system optionally including one or more of the first through fifth examples, further includes where the total trip distance is estimated based on historical usage patterns in response to an absence of a vehicle operator input. A seventh example of the system optionally including one or more of the first through sixth examples, further includes where the historical usage patterns includes data regarding driver behavior based on a day of the week, a time of day, a number of vehicle occupants, and a starting point. An eighth example of the system optionally including one or more of the first through seventh examples, further includes where the hybrid-electric vehicle is a plug-in hybrid electric vehicle or a battery electric vehicle. A ninth example of the system optionally including one or more of the first through eighth examples, further includes where a state of charge of the battery is maintained and the electric range increases as the engine propels the vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a hybrid vehicle comprising:
   an engine and an electric motor; and
   a controller with computer-readable instructions stored on non-transitory memory thereof that when executed enable the controller to:
      operate with engine propulsion and monitoring an increasing electric-only operation range determination increasing toward remaining trip distance as a powertrain temperature increases while state of charge is maintained and delaying electric-only operation, the electric-only operation range determined based on powertrain temperature, and then switch from engine propulsion to electric motor propulsion in response to the remaining trip distance at or greater than the determined electric-only operation range.

2. The system of claim 1, wherein the controller further includes instructions to switch when the powertrain temperature is greater than or equal to a threshold powertrain temperature.

3. The system of claim 1, wherein the switch is automatic and independent of vehicle operator inputs, wherein the operating is performed only when autonomous driving is present.

4. The system of claim 1, wherein the electric motor is coupled to a battery, and wherein no electric-only operation is performed after a start of a trip until the switch, and then no engine operation is thereafter performed during the trip.

5. The system of claim 1, wherein the remaining trip distance is measured from a current location of the hybrid vehicle to an intended destination, and where the remaining trip distance is equal to the electric range when the switch occurs.

6. The system of claim 5, wherein the intended destination comprises a recharging station, and where a state of charge of a battery of the hybrid vehicle is at least partially replenished at the recharging station.

7. A method for a hybrid vehicle comprising an engine and an electric motor, comprising:
   delaying an electric-only positive traction operation of a trip from a starting location to a recharging location until only after a remaining trip distance is equal to a determined electric-only range only when autonomous driving is requested, the electric-only operation initiated by deactivating the engine and activating the electric motor independently of vehicle operator input outside of accelerator and brake pedal actuation, where the determined electric-only range is determined based on powertrain temperature and increases as temperature increases while state of charge is maintained.

8. The method of claim 7, wherein a total trip distance is measured from the starting location to the recharging location, and where the electric-only range is less than the total trip distance.

9. The method of claim 7, further comprising enabling the initiation of the electric-only mode responsive to a powertrain temperature being greater than a threshold powertrain temperature, and operating with electric-only operation without delay in response to autonomous driving not request.

10. The method of claim 7, further comprising adjusting the recharging location following determination of the electric-only range being less than the remaining trip distance.

11. A system comprising:
a hybrid-electric vehicle comprising an engine and an electric motor coupled to a battery; and
a controller with computer-readable instructions stored on non-transitory memory thereof that when executed enable the controller to:
request input from a vehicle operator regarding a total trip distance, where the total trip distance is measured from a starting location to a recharging location;
delay an electric-only operation of the hybrid-electric vehicle in response to the total trip distance being greater than an electric-only range, the electric-only range determined based on powertrain temperature and increasing as temperature increases while state of charge is maintained; and
activate the electric-only operation in response to the determined electric-only range being equal to a remaining trip distance, where the remaining trip distance is measured from a current location to the recharging location.

12. The system of claim 11, wherein the remaining trip distance is less than the total trip distance.

13. The system of claim 11, wherein controller further includes instructions to propel the vehicle via the engine for a difference between the total trip distance and the remaining trip distance, and where the electric-only operation is activated automatically.

14. The system of claim 11, wherein a state of charge of the battery is decreased to zero when the vehicle reaches the recharging location.

15. The system of claim 11, wherein the battery is drained continuously once the electric-only response is activated until the vehicle reaches the recharging location.

16. The system of claim 11, wherein controller further includes instructions to propel the vehicle via the engine for a difference between the total trip distance and the remaining trip distance, and where waste heat from the engine is used to warm-up one or more of a powertrain, a vehicle cabin, and the battery.

17. The system of claim 11, wherein the total trip distance is estimated based on historical usage patterns in response to an absence of a vehicle operator input, further comprising a prompt being displayed to a vehicle operator at the starting location, the prompt requesting an input from the vehicle operator regarding an expected distance from the starting location to the recharging location.

18. The system of claim 17, wherein the historical usage patterns include data regarding driver behavior based on a day of the week, a time of day, a number of vehicle occupants, and a starting point.

19. The system of claim 11, wherein the hybrid-electric vehicle is a plug-in hybrid electric vehicle or a battery electric vehicle.

20. The system of claim 11, wherein a state of charge of the battery is maintained and the electric range increases as the engine propels the vehicle.

* * * * *